United States Patent [19]
Morimoto

[11] Patent Number: 5,969,759
[45] Date of Patent: Oct. 19, 1999

[54] SOLID STATE IMAGE SENSING DEVICE

[75] Inventor: Michihiro Morimoto, Tokyo, Japan

[73] Assignee: NEC Corporation, Tokyo, Japan

[21] Appl. No.: 08/774,010

[22] Filed: Dec. 26, 1996

[30] Foreign Application Priority Data

Dec. 27, 1995 [JP] Japan .................................. 7-341639

[51] Int. Cl.⁶ .................................................. H04N 3/14
[52] U.S. Cl. .......................... 348/311; 348/294; 348/303; 348/323
[58] Field of Search .................................. 348/300, 303, 348/311, 315, 316, 317, 319, 320, 321, 322, 323, 294; 257/232, 241; 250/208.1; H04N 3/14, 5/335

[56] References Cited

U.S. PATENT DOCUMENTS

| | | | |
|---|---|---|---|
| 4,928,158 | 5/1990 | Kimata | 357/24 |
| 5,038,215 | 8/1991 | Hadfield | 358/213.11 |
| 5,272,535 | 12/1993 | Elabd | 358/213.11 |
| 5,291,294 | 3/1994 | Hirota | 348/316 |
| 5,396,091 | 3/1995 | Kobayashi et al. | 257/241 |
| 5,650,352 | 7/1997 | Kamasz et al. | 437/53 |
| 5,742,659 | 4/1998 | Atac et al. | 378/98.8 |

FOREIGN PATENT DOCUMENTS 3-124176  5/1991  Japan .

*Primary Examiner*—Wendy Garber
*Assistant Examiner*—Jacqueline Wilson
*Attorney, Agent, or Firm*—Foley & Lardner

[57] ABSTRACT

By segmenting an image sensing area into a plurality of partial areas and changing the number of stages of dummy vertical electrodes to be inserted between vertical CCD registers and horizontal CCD registers, the output gate electrode, floating diffusion layer, reset gate electrode and rest drain of each horizontal CCD register can be aligned in a line to the main body of the horizontal CCD register. It is therefore possible to avoid the reduction of the transfer efficiency at the time of transferring charges, which have reached the channel under the horizontal transfer electrode, to the channel under a dummy horizontal transfer electrode.

20 Claims, 8 Drawing Sheets

SOLID STATE IMAGE SENSING DEVICE

BACKGROUND OF THE INVENTION

1. Field of the Invention

The present invention relates to a solid state image sensing device, and, more particularly, to a multi-output CCD solid state image sensing device.

2. Description of the Related Art

Today, the drive frequencies of horizontal CCD registers increase due to the increased resolution of solid state image sensing devices, which raises the problem of increased power consumption. One way of overcoming this problem is the use of the multi-output solid state image sensing device disclosed in Unexamined Japanese Patent Publication No. Hei 3-124176. To reduce the drive frequency, the image sensing area of this device is segmented into a plurality of partial image sensing areas and horizontal CCD registers and output sections are provided in association with the partial image sensing areas. This type of solid state image sensing device will now be discussed.

FIG. 1 is a block diagram of a conventional multi-output solid state image sensing device. This multi-output solid state image sensing device has an image sensing area where plural columns of pixels are arranged in parallel, each column of pixels consisting of a column of photoelectric conversion elements comprised of a plurality of photodiodes 1-1, and vertical CCD registers 1-3 coupled via transfer gates 1-2 to the associated photodiodes 1-1. The image sensing area is segmented to a plurality of partial image sensing areas 1a to 1d in the horizontal direction, in association with which horizontal CCD registers 2a to 2d are provided. Those horizontal CCD registers 2a–2d are respectively provided with output sections 3a to 3d.

Although the image sensing area of the illustrated device is divided to four partial image sensing areas, the number of segments is in no way limited to four. Strictly, several transfer stages of the image sensing area on the side of the horizontal CCD registers are covered with a light shielding film to be optical black areas. Although the illustrated case uses photodiodes as photoelectric conversion areas, the vertical CCD registers may also serve as photoelectric conversion areas.

In the multi-output solid state image sensing device, as the image sensing area is horizontally divided to four segments which are associated with four output sections, four output signals are acquired in parallel. Therefore, all the signals from the image sensing area can be output in one fourth the time needed to output all the signals from a single output section. In other words, with the use of four output sections, if the output time is the same, the signal output process may be accomplished in four times as long as the actually needed time. That is, the drive frequency of each of the horizontal CCD registers 2a–2d is reduced to ¼, so that the consumed power of the horizontal CCD registers (which is proportional to the capacitance and the drive frequency) can be reduced to about ¼.

The aforementioned Unexamined Japanese Patent Publication No. Hei 3-124176 does not describe a specific connecting structure for the horizontal CCD registers 2a–2d to the output sections 3a–3d. Let us consider the case where output sections based on a floating diffusion type charge sensor, the conventionally ordinary technology, (which are called "floating diffusion layer type amplifiers") are adapted to a multi-output solid state image sensing device.

FIG. 2A is a plan view showing the probable structure of the portion around the output section in the conventional multi-output solid state image sensing device. FIG. 2A shows the vicinity of the output section 3b. A plurality of vertical transfer electrodes (four vertical transfer electrodes per stage; only two of the vertical transfer electrodes, 12-3 and 12-4, at the last stage illustrated) are formed above the vertical CCD register channels 11a and 11b, and a device isolating layer (channel stopper) 13 is formed between the channels. Formed under the vertical transfer electrode 12-4 are horizontal CCD register channels 14a and 14b above which a plurality of horizontal transfer electrodes are formed. In the illustrated case, the horizontal transfer electrodes are driven by 2-phase pulses; the same pulse $\phi H_1$ or $\phi H_2$ is applied to a set of a storage electrode 15-2 and a barrier electrode 15-1. At one end of the horizontal CCD register 2b, the horizontal CCD register channel is bent in the opposite direction to the vertical CCD registers, and dummy horizontal transfer electrodes are formed on that channel. The dummy horizontal transfer electrodes, like the horizontal transfer electrodes, are driven by 2-phase pulses; the same pulse $\phi H_1$ or $\phi H_2$ is likewise applied to a set of a storage electrode 17-2 and a barrier electrode 17-1. There are several stages of dummy horizontal transfer electrodes. An output gate electrode 18, a floating diffusion layer 19, a reset gate electrode 20, a reset drain 21 and a source follower type amplifier 23 are provided adjacent to the last dummy transfer electrode. The floating diffusion layer 19 is connected to the gate electrode of a driver transistor at the first stage of the source follower type amplifier 23 by a wire 22, made of a conductive material like aluminum, tungsten or polysilicon. A device isolating layer is formed between the horizontal CCD register channels 14a and 14b.

The output operation will be discussed below. In the horizontal blanking period shown in FIG. 2B, signal charges stored in the channel under the vertical transfer electrode 12-3 are transferred to the horizontal CCD register channel (i.e., the channel under the horizontal transfer electrode to which the horizontal transfer pulse $\phi H_1$ is applied) via the channel under the vertical transfer electrode 12-4. In the horizontal effective period, signal charges are sequentially transferred toward the output sections in the horizontal direction. At the same time, the signal charges in the channel under the horizontal transfer electrodes 15b-1 and 15b-2 associated with the left end of the partial image sensing area 1b are transferred to the channel under the dummy horizontal transfer electrodes 17-1 and 17-2 (the transfer section is indicated by "T"). The signal charges which have been transferred to the channel under the last dummy horizontal transfer electrode are transferred to the floating diffusion layer 19, passing under the output gate electrode 18. Consequently, the potential of the floating diffusion layer 19 changes, and the changed potential is detected via the source follower type amplifier 23. When the reset gate electrode 20 is enabled after the detection of the signal charges, the potential of the floating diffusion layer 19 is reset to the potential of the reset drain 21.

While output sections based on a floating gate type charge sensor (called "floating gate type amplifiers") may be adapted to a multi-output solid state image sensing device, this scheme is not highly recommended because, as is well known, it suffers a lower charge sensitivity due to its detection capacitance being higher than that of the floating diffusion layer type amplifiers.

With the above structure, the channel length of the transfer section indicated by "T" in FIG. 2A, i.e., the transfer channel length at the time of transferring charges, which have reached the channel under the horizontal transfer electrode associated with the left end of one partial image sensing area, to the channel under the dummy horizontal transfer electrode, becomes equivalent to the lengthwise channel length under the horizontal transfer electrode or the channel width of the horizontal CCD register. While the horizontal transfer electrode normally has a length of about 1 to 3 μm, the width of the horizontal CCD register channel is set to approximately 10 to 30 μm, larger than the length of the horizontal transfer electrode. It is therefore very difficult to transfer charges, which have reached the channel under the horizontal transfer electrode associated with the left end of the partial image sensing area, to the dummy horizontal transfer electrode within the same time as needed for horizontal transfer, and the transfer efficiency becomes lower. Generally speaking, the individual horizontal CCD registers should be aligned on a line in order to set the transfer channel length similar to that of the horizontal transfer section. This design requires at least output gate electrodes and floating diffusion layers between the individual horizontal CCD registers. It is however apparent that the space for the provision of such elements cannot be secured.

SUMMARY OF THE INVENTION

Accordingly, it is an object of the present invention to provide a solid state image sensing device which can reduce consumed power of horizontal CCD registers without impairing the transfer efficiency.

A solid state image sensing device according to this invention comprises an image sensing area in which plural columns of pixels including vertical CCD registers are arranged in parallel; and a plurality of horizontal CCD registers having output sections and provided via a predetermined number of stages of dummy vertical CCD registers for each of a plurality of partial image sensing areas obtained by segmenting the image sensing area in a horizontal direction, whereby the number of stages is adjusted for each of the horizontal CCD registers to permit all of the horizontal CCD registers to be arranged in parallel to the image sensing area.

The horizontal CCD registers may be arranged along one side of the image sensing area with charge transfer directions of all of the horizontal CCD registers aligned, and the number of stages may be sequentially increased in accordance with a distance from a downstream end of the image sensing area in the charge transfer direction.

The horizontal CCD registers may be arranged along one side of the image sensing area with charge transfer directions of the horizontal CCD registers aligned, in such a manner as to be positioned away from a center line horizontally bisecting the image sensing area, and the number of stages may be sequentially decreased in accordance with a distance from the center line.

The charge transfer direction of the vertical CCD registers on one side of a center line vertically bisecting the image sensing area may be set opposite to that of the vertical CCD registers on the other side of the center line, the horizontal CCD registers may be arranged along two sides of the image sensing area with the center line in between, with charge transfer directions of the horizontal CCD registers aligned, and the number of stages may be sequentially increased in accordance with a distance from a downstream end of the image sensing area in the charge transfer direction.

The charge transfer direction of the vertical CCD registers on one side of a first center line vertically bisecting the image sensing area may be set opposite to that of the vertical CCD registers on the other side of the first center line, the horizontal CCD registers may be arranged along two sides of the image sensing area with charge transfer directions of the horizontal CCD registers aligned, in such a way as to be positioned away from a second center line horizontally bisecting the image sensing area, and the number of stages may be sequentially decreased in accordance with a distance from the second center line.

In those cases, each of the columns of pixels may consist of a column of photoelectric conversion elements comprised of a plurality of photodiodes and vertical CCD registers respectively coupled to the photodiodes, or the vertical CCD registers may also serve as the photoelectric conversion elements.

By changing the number of stages of dummy vertical CCD registers for each partial image sensing area, space can be secured at one end of each horizontal CCD register so that the dummy horizontal transfer electrode, output gate electrode, floating diffusion layer, reset gate electrode and reset drain of each horizontal CCD register can be aligned in a line to the horizontal CCD register. Therefore, the transfer channel length for the transfer of charges, which have reached the channel under the horizontal transfer electrode, to the dummy horizontal transfer electrode can be set substantially equal to the normal channel length of the horizontal transfer electrode section.

According to this invention, horizontal CCD registers are provided through dummy vertical CCD registers the number of whose stages differs from one of a plurality of partial image sensing areas acquired by segmenting the image sensing area of a CCD solid state image sensing device in the horizontal direction from another partial image sensing area, all the horizontal CCD registers associated with the individual partial image sensing areas can be arranged in parallel to one another. It is therefore possible to secure space at one end of each horizontal CCD register so that the dummy horizontal transfer electrode, output gate electrode, floating diffusion layer, reset gate electrode and rest drain of each horizontal CCD register can be aligned in a line to the horizontal CCD register. Thus, the transfer channel length for the transfer of charges, which have reached the channel under the horizontal transfer electrode corresponding to the left end of each partial image sensing area, to the dummy horizontal transfer electrode can be set substantially equal to the normal channel length of the horizontal transfer electrode section. This can reduce the consumed power of the horizontal CCD registers without degrading the transfer efficiency.

DETAILED DESCRIPTION OF THE PREFERRED EMBODIMENTS

Figure 3:
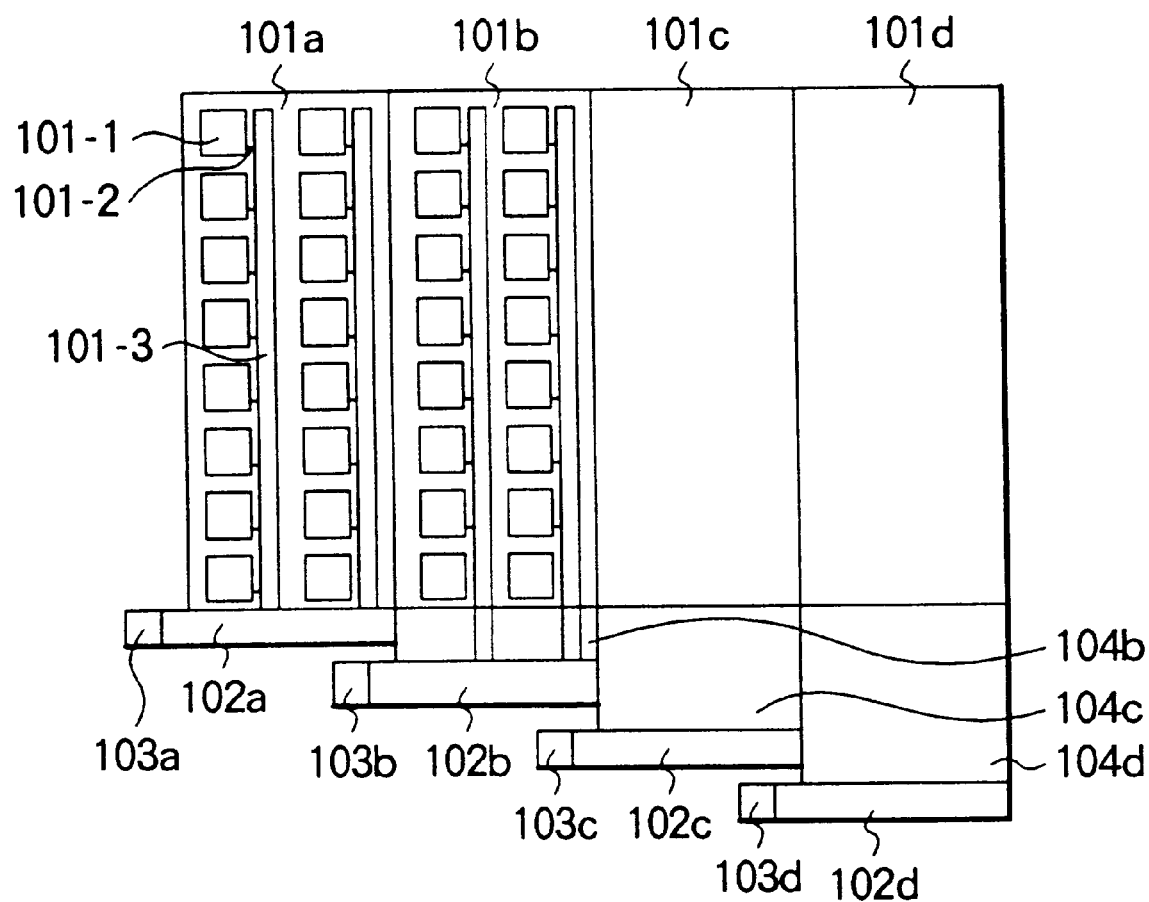
FIG. 3 is a block diagram of a solid state image sensing device according to the first embodiment of this invention.

FIG. 3 presents a block diagram of a solid state image sensing device according to the first embodiment of this invention. In this embodiment, an image sensing area where plural columns of pixels are arranged in parallel, each column of pixels consisting of a column of a plurality of photodiodes 101-1, and vertical CCD registers 101-3 coupled via transfer gates 101-2 to the associated photodiodes 101-1. The image sensing area is segmented to a plurality of partial image sensing areas 101a to 101d in the horizontal direction, in association with which horizontal CCD registers 102a to 102d are provided. Those horizontal CCD registers 102a–102d are respectively provided with output sections 103a to 103d.

Although the image sensing area of the illustrated device is divided to four partial image sensing areas 101a–101d, the number of segments is in no way limited to four. Dummy vertical transfer sections 104b to 104d are provided between the partial image sensing areas 101b–101d and the horizontal CCD registers 102b–102d, and are covered with a light shielding film. Strictly speaking, shielded optical black areas (not shown) are provided in the partial image sensing areas as well as the dummy vertical transfer sections. The length of the dummy vertical transfer sections or the number of stages of the dummy vertical transfer electrodes is sequentially increased from the vertical transfer section 104a toward the vertical transfer section 104d. In this manner, the horizontal CCD registers 102a–102d and the output sections 103a–103d associated with the partial image sensing areas 101a–101d are formed, shifted vertically.

Figure 1:
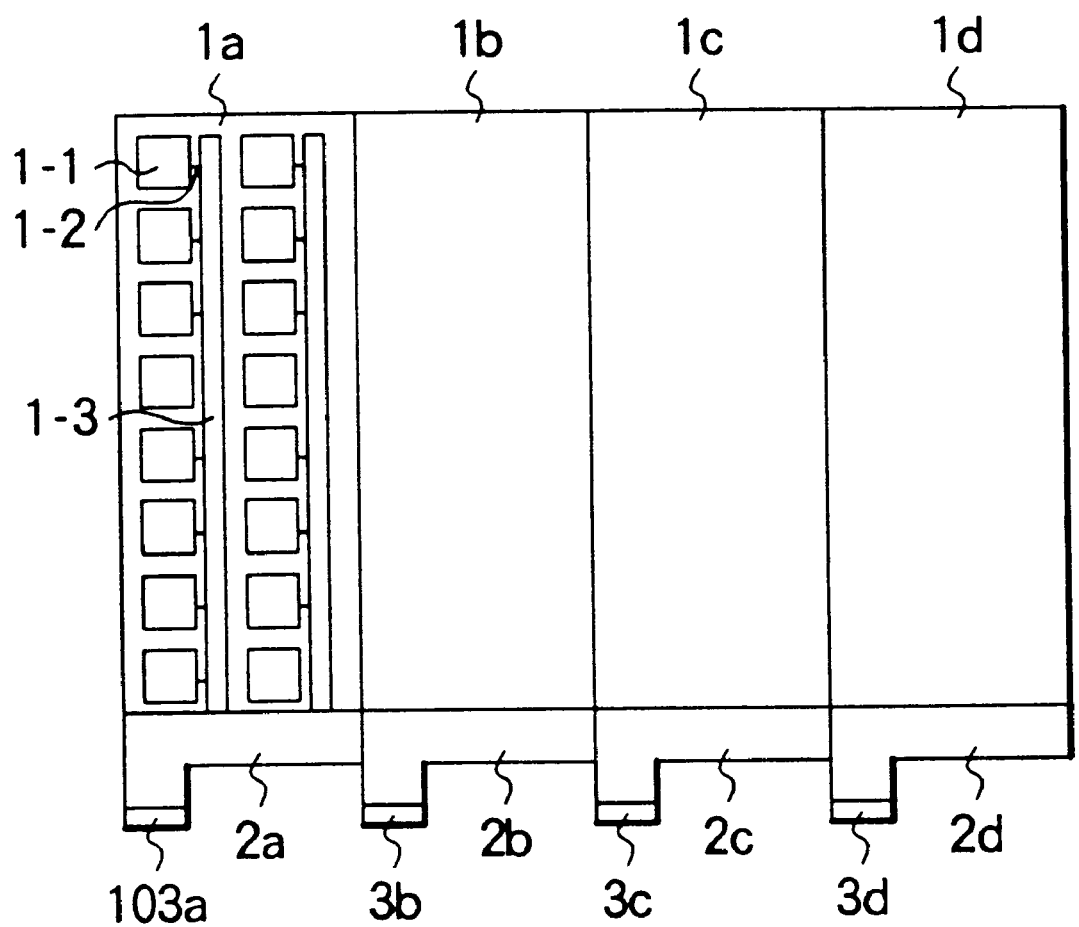
FIG. 1 is a block diagram of a conventional multi-output solid state image sensing device.
Figure 2A:
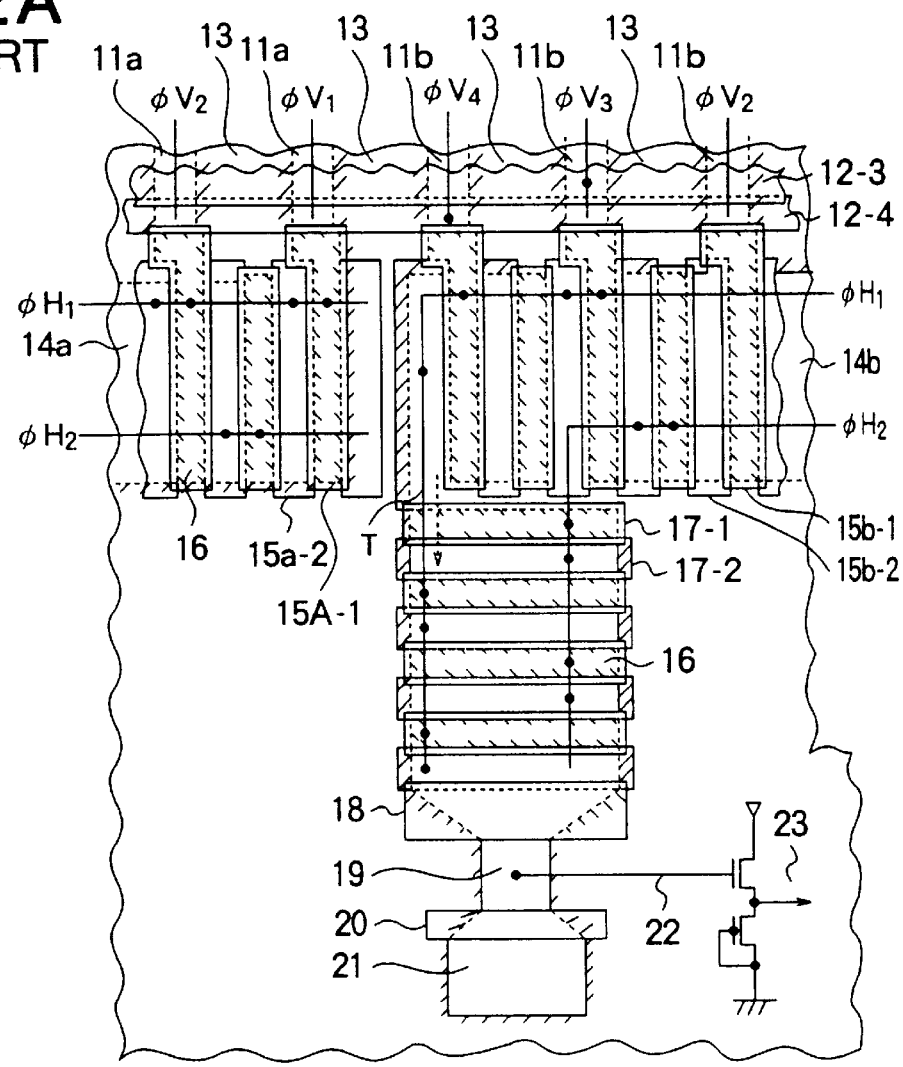
FIG. 2A is a plan view showing a portion around the output section of the conventional multi-output solid state image sensing device.
Figure 2B:
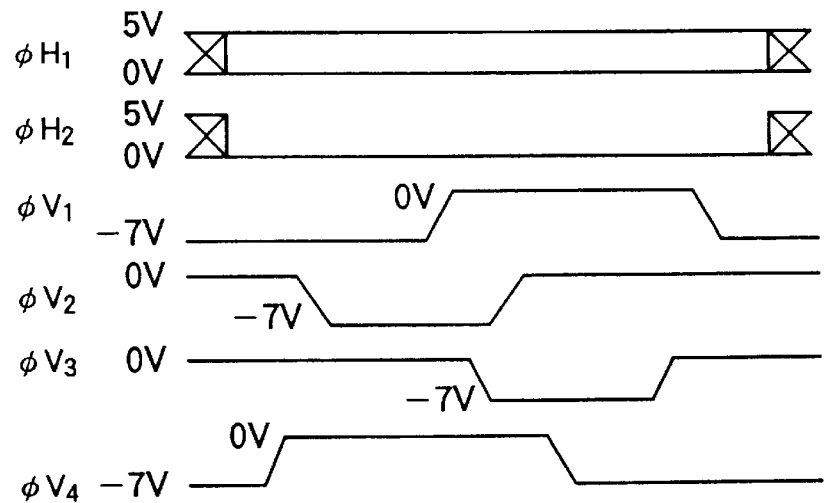
FIG. 2B is a signal waveform diagram for explaining the operation of the conventional multi-output solid state image sensing device.
Figure 4:
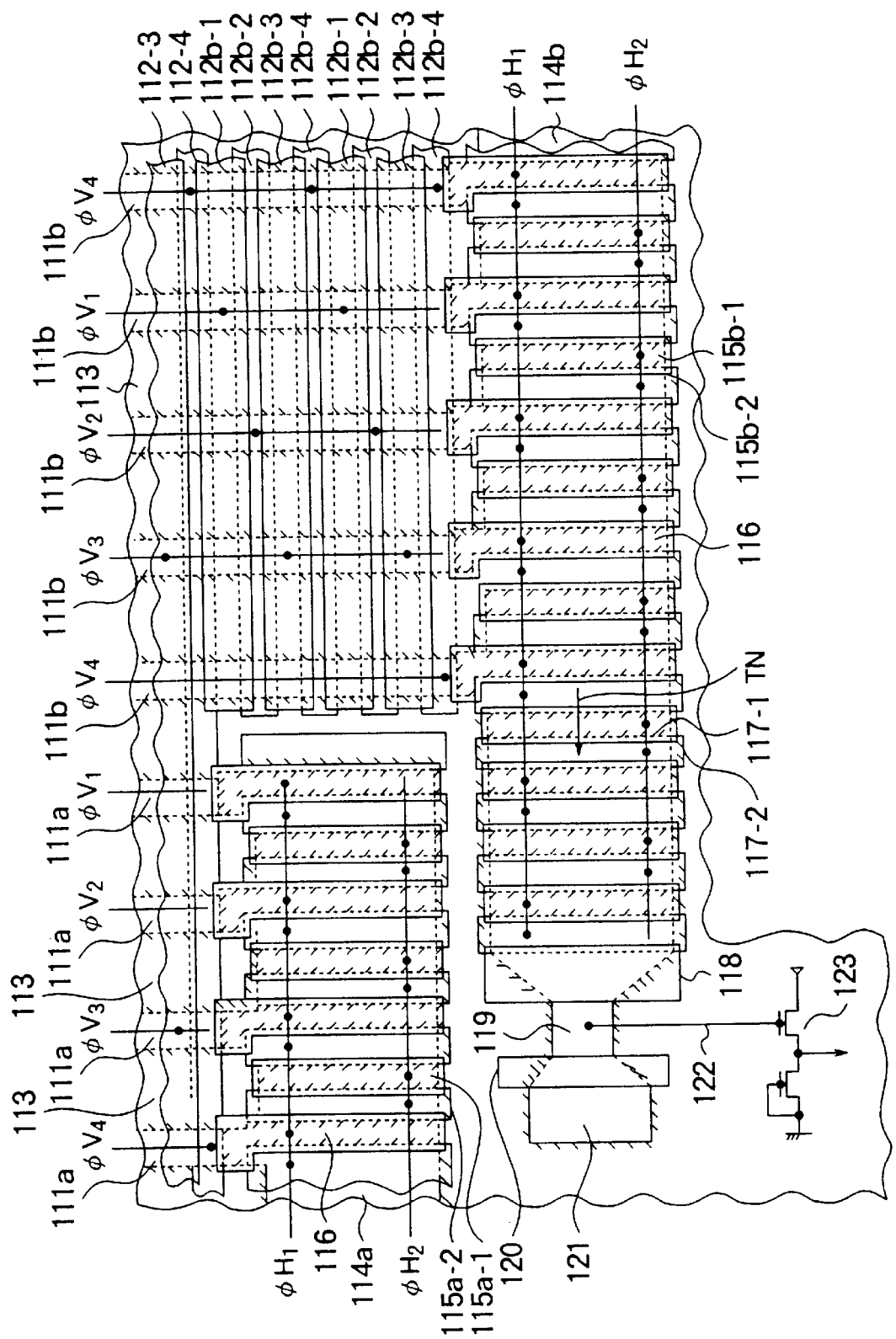
FIG. 4 is a plan view showing a portion around the output section of the first embodiment.

FIG. 4 is a plan view showing a portion around the output section in the solid state image sensing device according to the first embodiment of this invention. While the vicinity of only the output section 103b is illustrated, the structure is the same for the other output sections. A plurality of vertical transfer electrodes (four vertical transfer electrodes per stage; only two of the vertical transfer electrodes, 112-3 and 112-4, at the last stage illustrated) are formed above the vertical CCD register channels 111a and 111b. Formed between the channels is a device isolating layer 113 where unillustrated photodiodes and transfer gates are provided. Two sets of dummy vertical transfer electrodes 112b-1, 112b-2, . . . , 112b-4 are provided in the vicinity of the last stage of the vertical transfer electrode 112-4 of the partial image sensing area 101b to constitute a dummy vertical transfer section. Vertical transfer pulses $\phi V_1$ to $\phi V_4$ shown in FIG. 2B are sequentially applied to the dummy vertical transfer electrodes 112b-1 to 112b-4.

Formed under the partial image sensing area 101a and the dummy vertical transfer section 104b are horizontal CCD register channels 114a and 114b above which a plurality of horizontal transfer electrodes 115a-1, 115a-2, 115b-1 and 115b-2 are formed. In the illustrated case, the horizontal transfer electrodes are driven by 2-phase pulses; the same pulse is applied to a set of a storage electrode (115a-2, 115b-2) and a barrier electrode (115a-1, 115b-1). At one end of the horizontal CCD register 102b, the channel 114b of the horizontal CCD register 102b extends under the horizontal CCD register 102a, and dummy horizontal transfer electrodes 117-1 and 117-2 are formed on that channel. The dummy horizontal transfer electrodes, like the horizontal transfer electrodes, are driven by 2-phase pulses; the same pulse is likewise applied to a set of a storage electrode (117-2) and a barrier electrode (117-1). There are several dummy horizontal transfer stages. An output gate electrode 118, a floating diffusion layer 119, a reset gate electrode 120, a reset drain 121 and a source follower type amplifier 123 are provided adjacent to the last dummy transfer electrode. The floating diffusion layer 119 is connected to the gate electrode of a driver transistor at the first stage of the source follower type amplifier 123 by a wire 122, made of a conductive material like aluminum, tungsten or polysilicon. A device isolating layer 113 is formed between the horizontal CCD register channel 114b and the adjoining horizontal CCD register channel 114a. As the partial image sensing area 101b has a greater number of transfer stages than the partial image sensing area 101a by the added dummy vertical transfer electrode, the dummy horizontal transfer electrodes 117-1 and 117-2, the output gate electrode 118, the floating diffusion layer 119, the reset gate electrode 120 and the reset drain 121 are aligned in a line to the horizontal CCD register 102b. Integer stages of dummy vertical transfer electrodes (e.g., one stage consists of four electrodes) should be provided in an area larger by several micrometers than the channel width of the horizontal CCD register. In this embodiment, the numbers of stages of the dummy vertical transfer sections 104b, 104c and 104d are 2, 4 and 6, respectively. Though details will not be given, the shunt wiring technique should be employed according to which a pulse is supplied to the dummy vertical transfer electrode via, for example, the third buffer film, made of polysilicon, from, for example, the metal wire formed on the vertical CCD register channel.

The output operation will now be discussed. The horizontal CCD registers 102a–102d are driven by the same pulse $\phi H_1$ or $\phi H_2$. Although the operation of outputting signal charges of the partial image sensing area 101b will be described hereunder, the same is applied to the other partial image sensing areas. In the horizontal blanking period shown in FIG. 2B, signal charges stored in the channel under the vertical transfer electrode 112b-3 are transferred to the horizontal CCD register channel (i.e., the channel under the horizontal transfer electrode to which the horizontal transfer pulse $\phi H_1$ is applied) via the channel under the vertical transfer electrode 112b-4. In the horizontal effective period, signal charges are sequentially transferred toward the output sections in the horizontal direction. At the same time, the signal charges in the channel under the horizontal transfer electrode 115b-2 associated with the left end of the partial image sensing area 101b are transferred to the channel under the dummy horizontal transfer electrode 117-2 (the transfer section is indicated by "TN"). The signal charges which have been transferred to the channel under the last dummy horizontal transfer electrode are transferred to the floating diffusion layer 119 via the output gate electrode 118. Consequently, the potential of the floating diffusion layer 119 changes, and the changed potential is detected via the source follower type amplifier 123. When the reset gate electrode 120 is enabled after the detection of the signal charges, the potential of the floating diffusion layer 119 is reset to the potential of the reset drain 121.

With the above-described structure, the channel length of the transfer section indicated by "TN" in FIG. 4, i.e., the transfer channel length at the time of transferring charges, which have reached the channel under the horizontal transfer electrode associated with the left end of one partial image sensing area, to the channel under the dummy horizontal transfer electrode, becomes approximately 1 to 3 μm, similar to that of the main body of the horizontal CCD register. Since the transfer channel length can be set to about 1/10 of 10 to 30 μm, the transfer channel length in the prior art, it is apparent that the transfer efficiency can be improved significantly.

Figure 5:
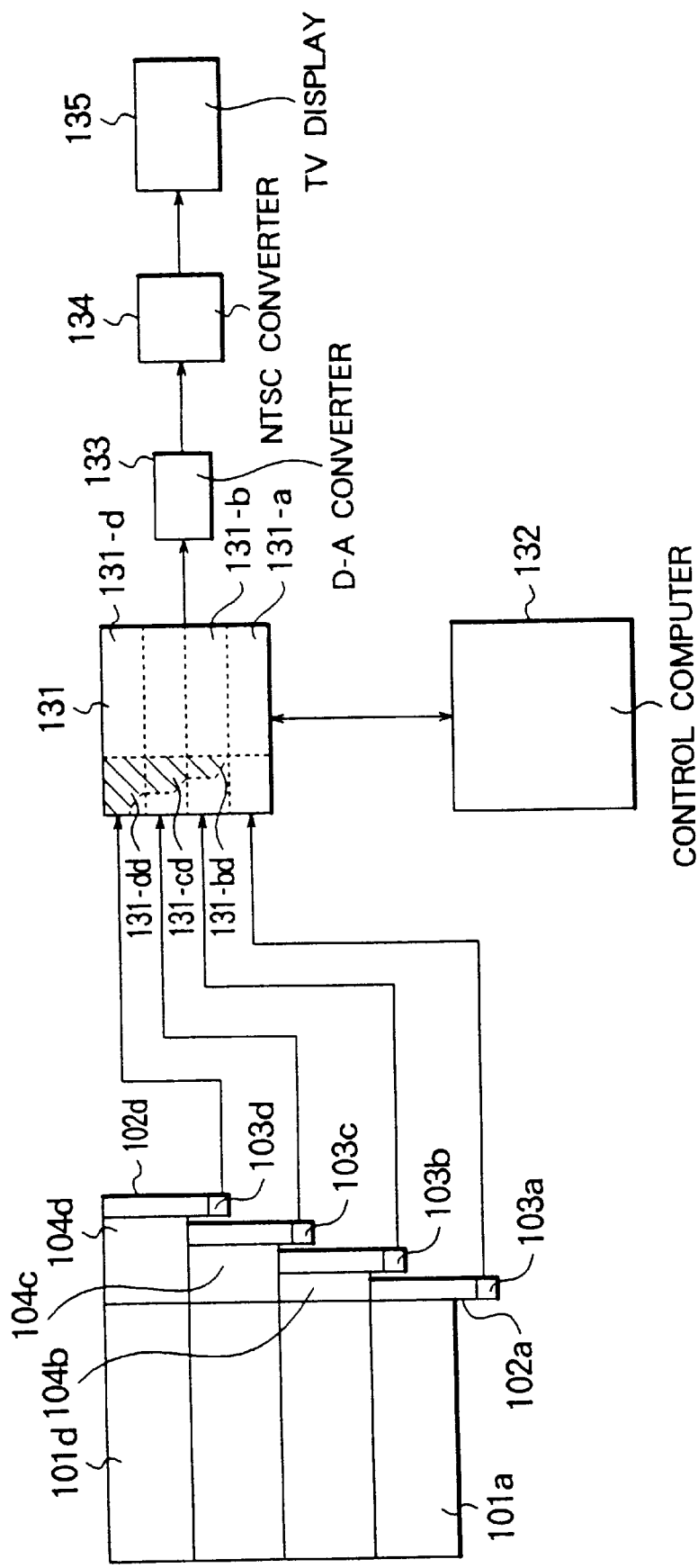
FIG. 5 is a block diagram of a system for reproducing an image from the solid state image sensing device according to the first embodiment.

FIG. 5 is a block diagram of the system which reproduces an image from the solid state image sensing device according to the first embodiment. Signal charges photoconverted by the individual photodiodes are read out to the associated vertical CCD registers. The signal charges read into the vertical CCD registers are transferred line by line to the horizontal CCD registers 102a–102d. When the vertical drive pulse is commonly used for the partial image sensing areas 101a–101d, signal charges for the horizontal lines, which are shifted by the differences in the numbers of stages of the dummy vertical transfer electrodes, are transferred to the respective horizontal CCD registers 102a–102d. The signal charges of the individual image sensing areas 101a–101d, transferred to the horizontal lines, which are shifted by the differences in the numbers of stages of the dummy vertical transfer electrodes, are transferred to the respective horizontal CCD registers 102a–102d, are output in parallel via the output sections 103a–103d which are provided adjacent to the respective horizontal CCD registers 102a–102d. The output signal charges are stored in a field memory 131 after A-D conversion. Connected to the field memory 131 is a control computer 132 which sets the address of the storage area and controls the readout order. In this embodiment, although the signal charges of the individual partial image sensing areas on the same horizontal line are output, shifted by a time corresponding to the number of dummy vertical transfer stages, the control computer 132 sets the address of the field memory 131 in a write mode in such a way as to be associated with the screen of the image sensing area, so that sensed image information is aligned in the same way as the image information in the field memory 131. In this manner, signal charges which have been in the dummy vertical transfer sections 104b–104d can be stored in, for example, storage areas 131-bd to 131-dd before horizontal transfer starts. In reproducing an image, image information in the field memory 131 is sequentially read out from the storage areas 131-a to 131-d as serial data to be displayed on a TV display 135 via a D-A converter 133 and an NTSC converter 134. Of course, instead of using the field memory, a delay circuit and a selector may be used so that signals from the output sections 103a–103d can be combined into one horizontal line of signals.

Figure 6:
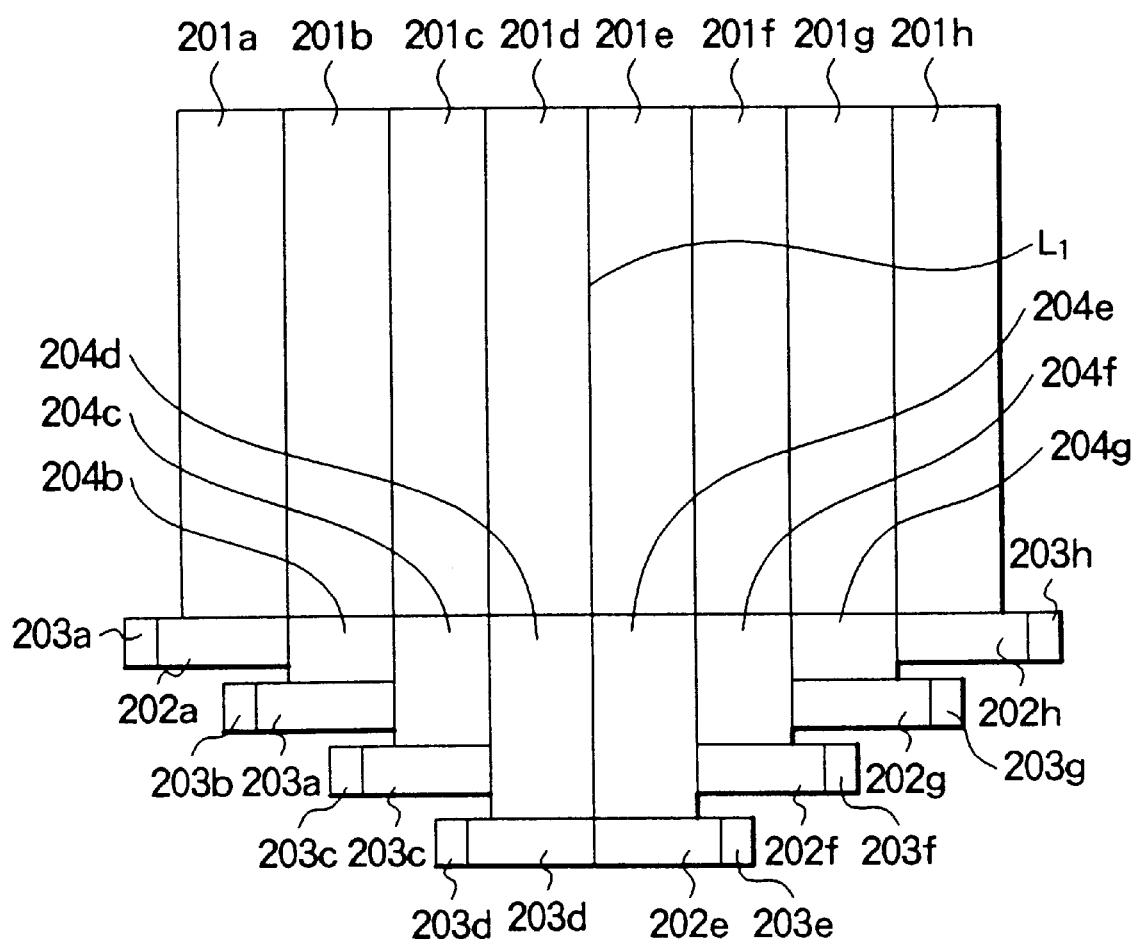
FIG. 6 is a block diagram of a solid state image sensing device according to the second embodiment of this invention.

FIG. 6 is a block diagram of a solid state image sensing device according to the second embodiment of this invention. In the first embodiment, the horizontal CCD registers are arranged along one side of the image sensing area with charge transfer directions of all the horizontal CCD registers aligned, and the number of stages of the dummy vertical register sections is sequentially increased in accordance with the distance from the downstream end of the image sensing area in the charge transfer direction. In the second embodiment, however, the horizontal CCD registers are arranged along one side of the image sensing area with charge transfer directions of the horizontal CCD registers aligned, in such a manner as to be positioned away from a center line $L_1$ horizontally bisecting the image sensing area, and the number of stages of the dummy vertical register sections is sequentially decreased in accordance with the distance from the center line $L_1$. The image sensing area is segmented to eight partial image sensing areas 201a to 201h and the number of stages of the dummy vertical register section should be, for example, "2" for sections 204b and 204g, "4" for sections 204c and 204f, and "6" for sections 204d and 204e. Further, the transfer direction of the horizontal CCD registers 202e–202h is set opposite to the transfer direction of the horizontal CCD registers 202a–202d. This design can double the number of horizontal CCD registers in the case where the maximum number of stages of the dummy vertical transfer electrodes is set the same as that (6) of the first embodiment. This provides an advantage that the drive frequency of the horizontal CCD registers can be reduced to a half, thus permitting the consumed power of the horizontal CCD registers to be reduced to a half. It is to be noted that the structure of a portion around the output section is the same as that of the first embodiment. Although the reversing the transfer direction of the horizontal CCD registers inverts the order of reading out the signal charges to the horizontal direction, image information can be written and reproduced with the same structure as that of the first embodiment by allowing the control computer to set the address of the field memory in a write mode in such a way as to be associated with the screen of the image sensing area but in a different way from the one employed in the first embodiment.

Figure 7:
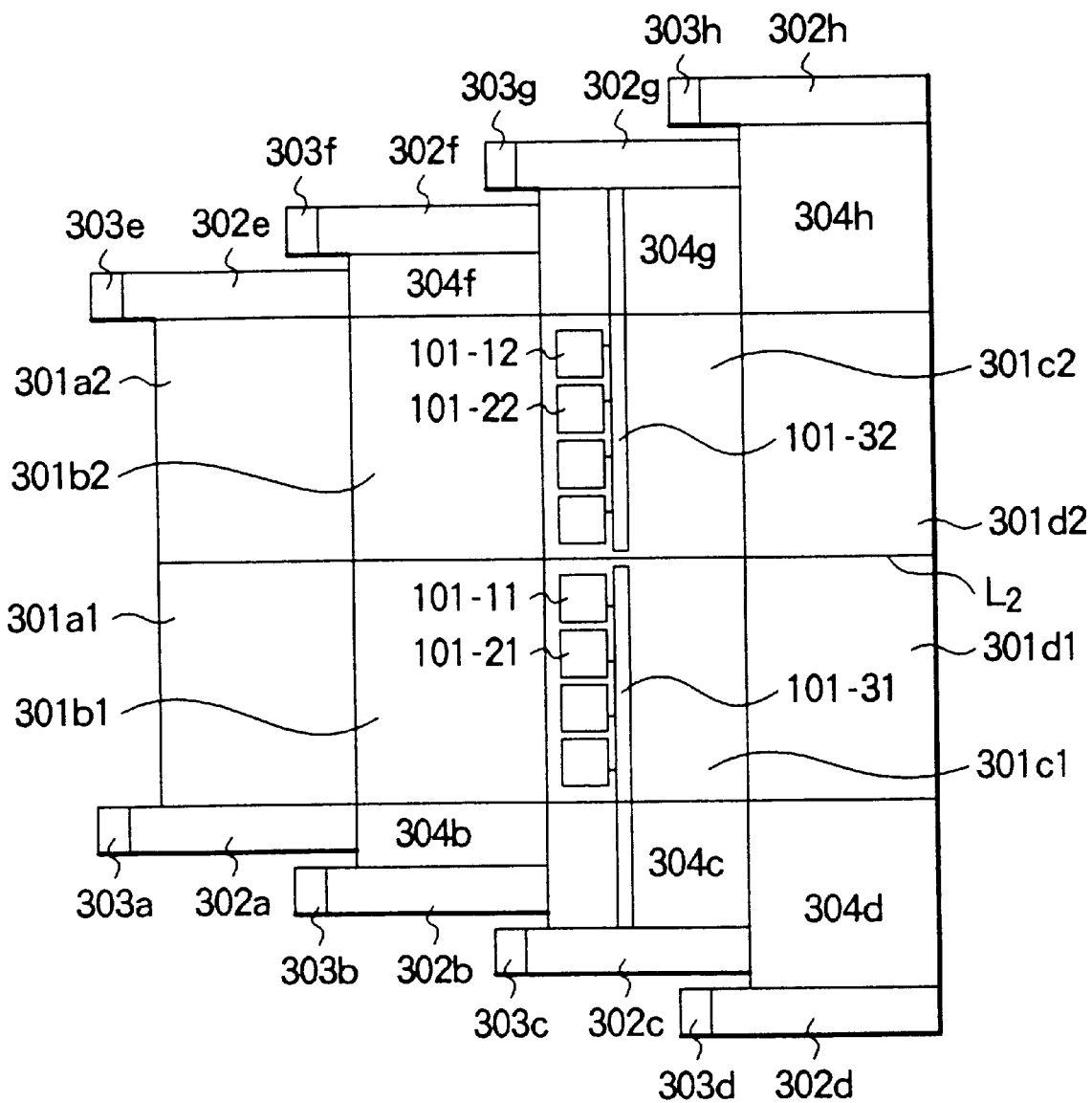
FIG. 7 is a block diagram of a solid state image sensing device according to the third embodiment of this invention.

FIG. 7 is a block diagram of a solid state image sensing device according to the third embodiment of this invention. In this embodiment, the charge transfer direction of the vertical CCD registers on one side of a center line $L_2$ vertically bisecting the image sensing area is set opposite to that of the vertical CCD registers on the other side of the center line $L_2$, the horizontal CCD registers are arranged along two sides of the image sensing area with the center line $L_2$ in between, with charge transfer directions of the horizontal CCD registers aligned, and the number of stages of the dummy vertical transfer sections is sequentially increased in accordance with the distance from the downstream end of the image sensing area in the charge transfer direction.

The column of pixels under the center line $L_2$ in the diagram includes a vertical CCD register 101-31 which is coupled to a plurality of photodiodes 101-11 via transfer gates 101-21, the charge transfer direction of the vertical CCD register 101-31 is directed away from the center line $L_2$, the column of pixels above the center line $L_2$ includes a vertical CCD register 101-32 which is coupled to a plurality of photodiodes 101-12 via transfer gates 101-22, and the charge transfer direction of the vertical CCD register 101-32 is directed away from the center line $L_2$. The charge transfer directions of horizontal CCD registers 302a to 302d and 302e to 302h are all the same and are directed from right to left in the diagram. The numbers of stages for dummy vertical transfer sections 304b, 304f, 304c, 304g, 304d and 304h are respectively "2," "4" and "6," for example.

According to this structure, the horizontal CCD registers 303e–303h are provided at the upper side of the image sensing area. This design can double the number of horizontal CCD registers in the first embodiment in the case where the number of stages of the dummy vertical transfer electrodes is set the same as that of the first embodiment. It is therefore possible to halve the drive frequency of the horizontal CCD registers, thus ensuring easier signal processing. In this case, the total consumed power of the horizontal CCD registers is the same as those of the first and second embodiment.

The structure of a portion around the output section is the same as that of the first embodiment (FIG. 4). Although the order of reading out the signal charges is inverted to the vertical direction because of the horizontal CCD registers 303e–303h provided at the upper side of the image sensing area, image information can be written and reproduced with the same structure as that of the first embodiment by allowing the control computer to set the address of the field memory in a write mode in such a way as to be associated with the screen of the image sensing area but in a different way from those employed in the first and second embodiments.

Figure 8:
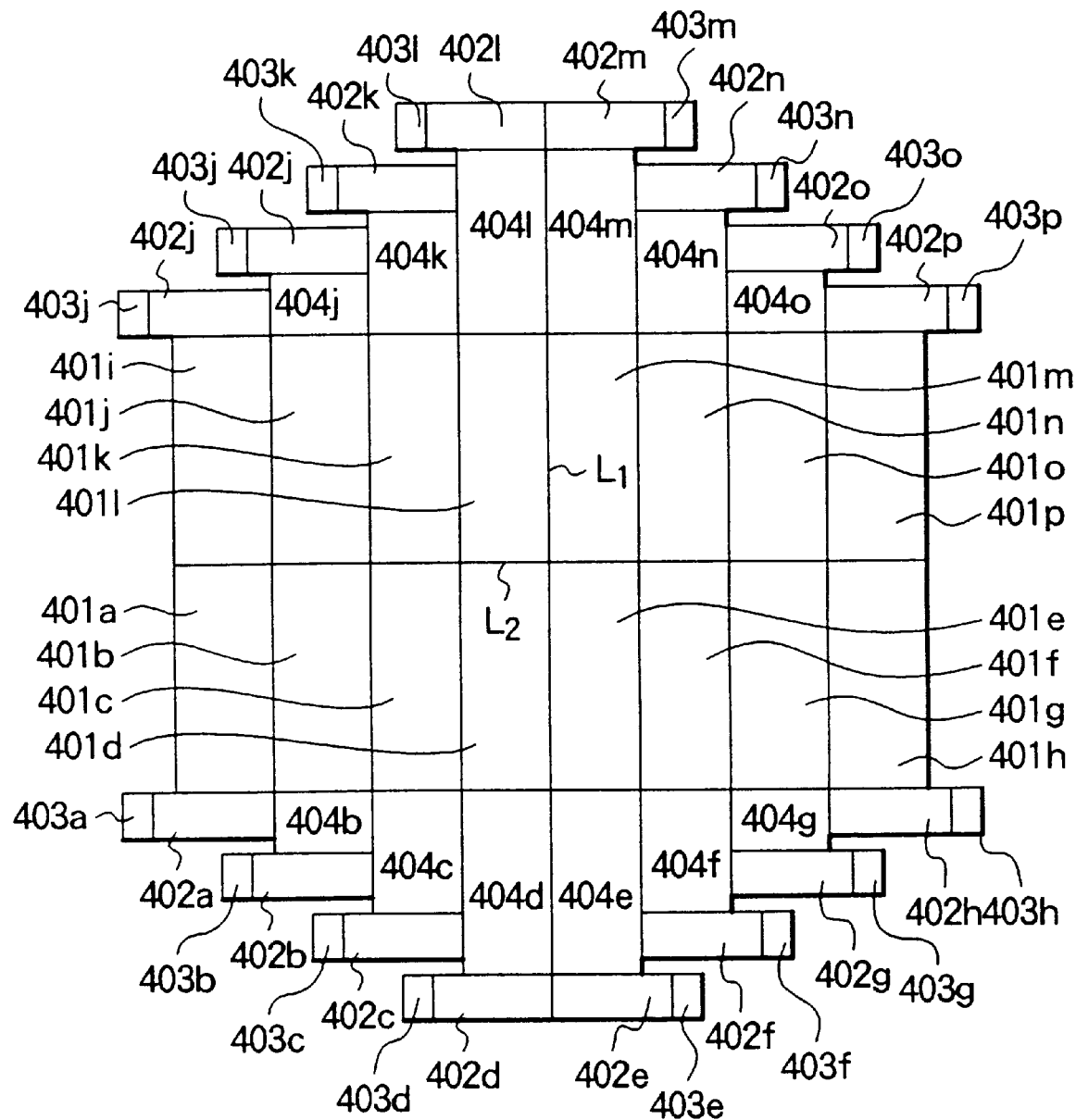
FIG. 8 is a block diagram of a solid state image sensing device according to the fourth embodiment of this invention.

FIG. 8 is a block diagram of a solid state image sensing device according to the fourth embodiment of this invention. In this embodiment, the charge transfer direction of the vertical CCD registers on one side of a first center line $L_2$ vertically bisecting the image sensing area is set opposite to that of the vertical CCD registers on the other side of the first center line $L_2$, the horizontal CCD registers are arranged along two sides of the image sensing area with charge transfer directions of the horizontal CCD registers aligned, in such a way as to be positioned away from a second center line $L_1$ horizontally bisecting the image sensing area, and the number of stages of the dummy vertical register sections is sequentially decreased in accordance with a distance from the second center line $L_1$. That is, the fourth embodiment is the combination of the second and third embodiments.

The charge transfer direction of the vertical CCD registers in partial image sensing areas 401a to 401h is opposite to that of the vertical CCD registers in partial image sensing areas 401i to 401p, both directions set to be away from a first center line $L_2$. The charge transfer direction of horizontal CCD registers 402a to 402d and 402i to 402l are opposite to the charge transfer direction of horizontal CCD registers 402e to 402h and 402m to 402p, both directions set to be away from a second center line $L_1$. The number of stages of dummy vertical CCD registers is "2" for sections 404b, 404g, 404j and 403o, "4" for sections 404c, 404f, 404k and 404n and "6" for sections 404d, 404e, 404l and 404m, for example.

This embodiment has the advantage of the second embodiment of halving the consumed power of the horizontal CCD registers and the advantage of the third embodiment of ensuring easier signal processing.

The structure of a portion around the output section is the same as that of the first embodiment (FIG. 4). Although the order of reading out the signal charges is inverted to the horizontal direction and the vertical direction because of the use of the horizontal CCD registers having the opposite transfer directions and the provision of the horizontal CCD registers along two sides of the image sensing area, image information can be written and reproduced with the same structure as that of the first embodiment by allowing the control computer to set the address of the field memory in a write mode in such a way as to be associated with the screen of the image sensing area but in a different way from those employed in the first to third embodiments.

Although the foregoing description of those embodiments has been given with reference to the case where photodiode which become photoelectric conversion areas are provided, it is apparent without any further detailed description that this invention can be adapted to the case where the vertical CCD registers serve as photoelectric conversion areas.

What is claimed is:

1. A solid state image sensing device comprising:
   an image sensing area in which plural columns of pixels including vertical CCD registers are arranged in parallel; and
   a plurality of horizontal CCD registers having output sections and provided via a predetermined number of stages of dummy vertical CCD registers for each of a plurality of partial image sensing areas obtained by segmenting said image sensing area in a horizontal direction,
   wherein said predetermined number of stages is adjusted for each of said horizontal CCD registers to permit all of said horizontal CCD registers to be arranged in parallel to each other.

2. The solid state image sensing device according to claim 1, wherein said horizontal CCD registers are arranged along one side of said image sensing area with charge transfer directions of all of said horizontal CCD registers aligned, and said predetermined number of stages is sequentially increased in accordance with a distance from a downstream end of said image sensing area in said charge transfer direction.

3. The solid state image sensing device according to claim 1, wherein said horizontal CCD registers are arranged along one side of said image sensing area with charge transfer directions of said horizontal CCD registers aligned, in such a manner as to be positioned away from a center line horizontally bisecting said image sensing area, and said predetermined number of stages is sequentially decreased in accordance with a distance from said center line.

4. The solid state image sensing device according to claim 1, wherein a charge transfer direction of said vertical CCD registers on one side of a center line vertically bisecting said image sensing area is set opposite to that of said vertical CCD registers on the other side of said center line, said horizontal CCD registers are arranged along two sides of said image sensing area with said center line in between, with charge transfer directions of said horizontal CCD registers aligned, and said predetermined number of stages is sequentially increased in accordance with a distance from the downstream end of said image sensing area in said charge transfer direction.

5. The solid state image sensing device according to claim 1, wherein a charge transfer direction of said vertical CCD registers on one side of a first center line vertically bisecting said image sensing area is set opposite to that of said vertical CCD registers on the other side of said first center line, said horizontal CCD registers are arranged along two sides of said image sensing area with charge transfer directions of said horizontal CCD registers aligned, in such a way as to be positioned away from a second center line horizontally bisecting said image sensing area, and said predetermined number of stages is sequentially decreased in accordance with a distance from said second center line.

6. The solid state image sensing device according to claim 1, wherein each of said columns of pixels consists of a column of photoelectric conversion elements comprised of a plurality of photodiodes and vertical CCD registers respectively coupled to said photodiodes.

7. The solid state image sensing device according to claim 1, wherein said vertical CCD registers also serve as said photoelectric conversion elements.

8. The solid state image sensing device according to claim 2, wherein each of said columns of pixels consists of a column of photoelectric conversion elements comprised of a plurality of photodiodes and vertical CCD registers respectively coupled to said photodiodes.

9. The solid state image sensing device according to claim 3, wherein each of said columns of pixels consists of a column of photoelectric conversion elements comprised of a plurality of photodiodes and vertical CCD registers respectively coupled to said photodiodes.

10. The solid state image sensing device according to claim 4, wherein each of said columns of pixels consists of a column of photoelectric conversion elements comprised of a plurality of photodiodes and vertical CCD registers respectively coupled to said photodiodes.

11. The solid state image sensing device according to claim 5, wherein each of said columns of pixels consists of a column of photoelectric conversion elements comprised of a plurality of photodiodes and vertical CCD registers respectively coupled to said photodiodes.

12. The solid state image sensing device according to claim 2, wherein said vertical CCD registers also serve as said photoelectric conversion elements.

13. The solid state image sensing device according to claim 3, wherein said vertical CCD registers also serve as said photoelectric conversion elements.

14. The solid state image sensing device according to claim 4, wherein said vertical CCD registers also serve as said photoelectric conversion elements.

15. The solid state image sensing device according to claim 5, wherein said vertical CCD registers also serve as said photoelectric conversion elements.

16. A solid state image sensing device comprising:

an image sensing area including a plurality of partial image sensing areas obtained by segmenting said image sensing area in a horizontal direction;

a plurality of columns of pixels including vertical CCD registers, arranged in parallel in said image sensing area;

a plurality of horizontal CCD registers, wherein each of said partial image sensing areas has associated with it a horizontal CCD register which is coupled to one of said vertical CCD registers;

a plurality of output gate electrodes, wherein each of said output gate electrodes is coupled to one of said horizontal CCD registers;

a plurality of floating diffusion layers, wherein each of said floating diffusion layers is coupled to one of said output gate electrodes; and a predetermined number of stages of dummy vertical CCD registers for each of said plurality of partial image sensing areas, wherein said predetermined number of stages is adjusted for each of said horizontal CCD registers to permit all of said horizontal CCD registers to be arranged in parallel to one another.

17. A method for forming a solid state image sensing device, the method comprising the steps of:

forming an image sensing area;

segmenting said image sensing area in a horizontal direction to obtain a plurality of partial image sensing areas;

forming a plurality of columns of pixels including vertical CCD registers, arranged in parallel in said image sensing area;

forming a plurality of horizontal CCD registers, wherein each of said partial image sensing areas has associated with it a horizontal CCD register which is coupled to one of said vertical CCD registers;

forming a plurality of output gate electrodes, wherein each of said output gate electrodes is coupled to one of said horizontal CCD registers;

forming a plurality of floating diffusion layers, wherein each of said floating diffusion layers is coupled to one of said output gate electrodes; and forming a fixed number of stages of dummy vertical CCD registers for each of said plurality of partial image sensing areas, wherein said fixed number of stages is adjusted for each of said horizontal CCD registers to permit all of said horizontal CCD registers to be arranged in parallel to one another.

18. The method for forming a solid state image sensing device according to claim 17, wherein said horizontal CCD registers are formed along one side of said image sensing area with charge transfer directions of all of said horizontal CCD registers aligned, and said number of stages is sequentially increased in accordance with a distance from a downstream end of said image sensing area in said charge transfer direction.

19. The method for forming a solid state image sensing device according to claim 17, wherein said horizontal CCD registers are formed along one side of said image sensing area with charge transfer directions of said horizontal CCD registers aligned, in such a manner as to be positioned away from a center line horizontally bisecting said image sensing area, and said fixed number of stages is sequentially decreased in accordance with a distance from said center line.

20. The method for forming a solid state image sensing device according to claim 17, wherein:

said vertical CCD registers are formed such that a charge transfer direction of said vertical CCD registers on one side of a center line vertically bisecting said image sensing area is set opposite to that of said vertical CCD registers on the other side of said center line; and said horizontal CCD registers are formed along two sides of said image sensing area with said center line in between, with charge transfer directions of said horizontal CCD registers aligned, and said fixed number of stages is sequentially increased in accordance with a distance from the downstream end of said image sensing area in said charge transfer direction.

* * * * *